Dec. 13, 1966 G. O. HALL ETAL 3,291,527
VERTICAL ADJUSTABLE BACK
Filed March 7, 1966
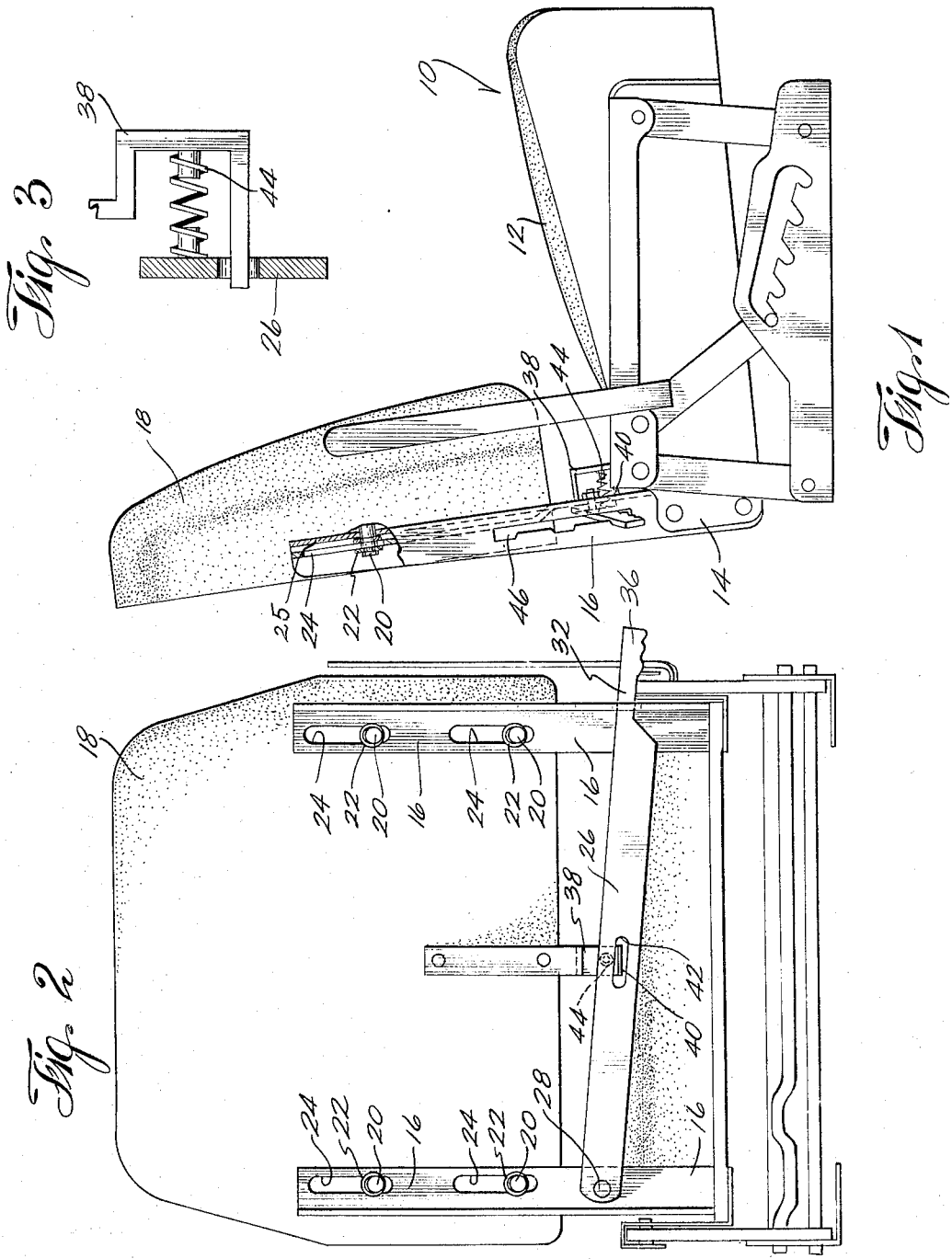
Inventors
Garth O. Hall
Harvey N. Tengler
Arthur O. Radke
By Andrew O. Peters
Attorney 3,291,527
VERTICAL ADJUSTABLE BACK
Garth O. Hall, Brookfield, Harvey N. Tengler, New Berlin, and Arthur O. Radke, Shorewood, Wis., assignors to Bostrom Corporation, Milwaukee, Wis., a corporation of Wisconsin
Filed Mar. 7, 1966, Ser. No. 532,139
4 Claims. (Cl. 297—353)

This invention pertains to improvements in vehicle seats and particularly to improvements in adjustment mechanisms for adjusting the vertical position of the seat's back member.

The principal object of the present invention is to provide a simple adjustment mechanism of this type, and particularly to provide a mechanism which can be blindly operated without requiring the occupant to leave the seat or to divert his attention from the operation of the vehicle.

A further object of this invention is to reduce the manual effort which has to be exerted in order to change the vertical position of the back member.

These objects are attained by providing a lever which extends transverse to the seat just below the back member and which has a gripping portion projecting just beyond the back support structure of the seat. The lever is connected to the back part through pivotal connecting means and can be moved upwardly or downwardly between several positions of a rack to correspondingly change the back member's positions. Since only the gripping portion is exposed, the adjustment mechanism in no way interferes with the access to the seat or with the operation of the vehicle.

Other objects and advantages will be pointed out in, or be apparent from, the specification and claims, as will obvious modifications of the single embodiment shown in the drawings, in which:

FIG. 1 is a side view of a vehicle seat embodying the present adjustment mechanism with portions broken away for the sake of clarity;

FIG. 2 is the back plan view thereof; and

FIG. 3 is an enlarged cross-sectional view of the connection between the dependent tongued back member and the adjustment lever.

Referring to the drawings the illustrated seat is comprised of a seat member 10 having a cushioned portion 12 and a rigid frame 14 the latter being adapted to be rigidly fixed to the floor of the vehicle. Two upwardly extending guide members 16 are connected to rearwardly extending portions of the frame 14 at each rear corner of the seat member.

The back member 18 is slidably connected to the guide members by pins 20 which extend through slots 24 in the guide members. Suitable washers 22 are provided on the pins. The pins are fixed to an appropriate frame structure 25 of the back member.

A lever 26 is pivotally connected to one of the guide members by a bolt 28. This connection permits the lever to pivot around the bolt generally in the plane of the back member. Also, the clearance between the bolt and the lever is such that limited pivotal motion in the fore and aft direction is permissible. The lever extends transversely to the seat and is provided at its other end with a rack engaging portion 32 and gripping portion 36. The back member is connected to the lever by a dependent tongue 38 which is fixed to the frame structure of the back member and which has a backwardly extending flange 40 in engagement with a slot 42 at the center of the lever. A spring 44 is positioned between the tongue and the lever and biases the lever towards the rear of the seat so that its rack engaging portion 32 is in engagement with one of the notches of the rack of 46.

When the occupant desires to adjust the height of the back member, he merely grips the handle and pulls it slightly towards him against the bias of the spring 44 and thereafter moves the lever vertically until it is again engaged with one of the notches of the rack. As it is apparent, the simplicity of the mechanism permits the height to be adjusted without requiring the occupant to divert his attention from the operation of the machine or vehicle. Also, since the back member is connected at the mid point of the lever, the adjustment mechanism provides a two to one mechanical advantage and thus requires only minimal effort to accomplish the desired adjustment.

Although but a single embodiment of the present invention has been illustrated and described, it will be apparent to those skilled in the art that various changes and modifications may be made therein without departing from the spirit of the invention or from the scope of the appended claims.

We claim:

1. An adjustment mechanism for moving the back member between a number of preselected vertical positions in respect to the seat member, comprising:
   guiding means fixed to the seat member and connected to said back member to permit vertical adjustment movement of said back member;
   lever means fixed by first pivotal connecting means to the seat member and by second pivotal connecting means to said back member;
   said lever means having a handle portion which is adapted to be gripped and moved to pivot said lever in a vertical plane in respect to said seat member and thus correspondingly move said back member;
   upwardly extending rack means fixed to said seat member and defining several vertical positions at which said lever may be selectively engaged with said rack; and
   means for maintaining said lever means in engagement with said rack at any of the several vertical positions.

2. An adjustment mechanism according to claim 1 wherein said lever means is comprised of an elongated member which is fixed at one of its ends to said seat member at one side of the rear portion of said seat member and extends across the rear portion of said seat member and is engageable with said rack at its other end, with said rack being fixed to said seat member at the other side of the rear portion of said seat member; and wherein said back member is connected to said elongated member intermediate the ends of said elongated member.

3. An adjustment mechanism according to claim 2 wherein said second pivotal connecting means is comprised of slot means provided in said elongated member said slot means being engaged by a tongue member which is fixed to said back member.

4. An adjustment mechanism according to claim 3 wherein said maintaining means is comprised of spring means connected between said tongue member and said elongated member and biases said member into an engaging direction in respect to said rack means.

References Cited by the Examiner
UNITED STATES PATENTS

| | | | |
|---|---|---|---|
| 2,091,733 | 8/1937 | Hemminger et al. | 297—353 |
| 2,239,732 | 4/1941 | Newhardt | 297—353 |
| 2,509,102 | 5/1950 | Kuebler | 297—353 |
| 2,603,275 | 7/1952 | Kuebler | 297—353 |
| 2,712,346 | 7/1955 | Sprinkle | 297—343 |
| 3,055,706 | 9/1962 | Van der Meer et al. | 297—358 |

FRANK B. SHERRY, Primary Examiner.
G. O. FINCH, Assistant Examiner.